United States Patent

[11] 3,601,982

| [72] | Inventor | James W. McCrocklin |
| | | Alexandria, Va. |
| [21] | Appl. No. | 836,472 |
| [22] | Filed | June 25, 1969 |
| [45] | Patented | Aug. 31, 1971 |
| [73] | Assignee | A. S. Callaway |

[54] EMISSION CONTROL DEVICE
5 Claims, 3 Drawing Figs.

[52] U.S. Cl............................................ 60/30,
23/277 C
[51] Int. Cl.............................................. F01n 3/14
[50] Field of Search................................. 60/29, 30;
23/2 C, 277 C

[56] References Cited
UNITED STATES PATENTS

| 1,605,484 | 11/1926 | Thompson.................... | 60/29 |
| 1,848,990 | 3/1932 | Boyd............................ | 60/30 |
| 2,829,730 | 4/1958 | Barkelew...................... | 60/30 |
| 3,059,421 | 10/1962 | Schnabel....................... | 60/30 |
| 3,209,531 | 10/1965 | Morris.......................... | 60/30 |
| 3,209,532 | 10/1965 | Morris.......................... | 60/30 |
| 3,360,927 | 1/1968 | Cornelius..................... | 60/30 |
| 3,435,613 | 4/1969 | Eannarino.................... | 60/30 |

Primary Examiner—Douglas Hart
Attorney—H. Fred Starobin

ABSTRACT: Concentric inner and outer housings of a combined acoustical muffler and afterburner for internal-combustion engines form a passageway through which fresh air is introduced. As the fresh air flows along the passageway, it is preheated by conduction through the wall of the inner housing and it is then mixed with the incoming exhaust gas. The mixture is passed through tubes in the inner housing and is then ignited whereafter the afterburning mixture is caused to flow first in one direction along the outsides of the tubes thereby superheating the mixture as it passes through the tubes, and then in the opposite direction, while scrubbing along the inner surface of the wall of the inner housing, thereby preheating the incoming fresh air. A wire filling the space between the inner and outer housings is spiralled around the inner housing to lengthen the passageway for the incoming fresh air so as to maximize the heat transfer between the hot combustor wall and the incoming fresh air.

PATENTED AUG 31 1971
3,601,982
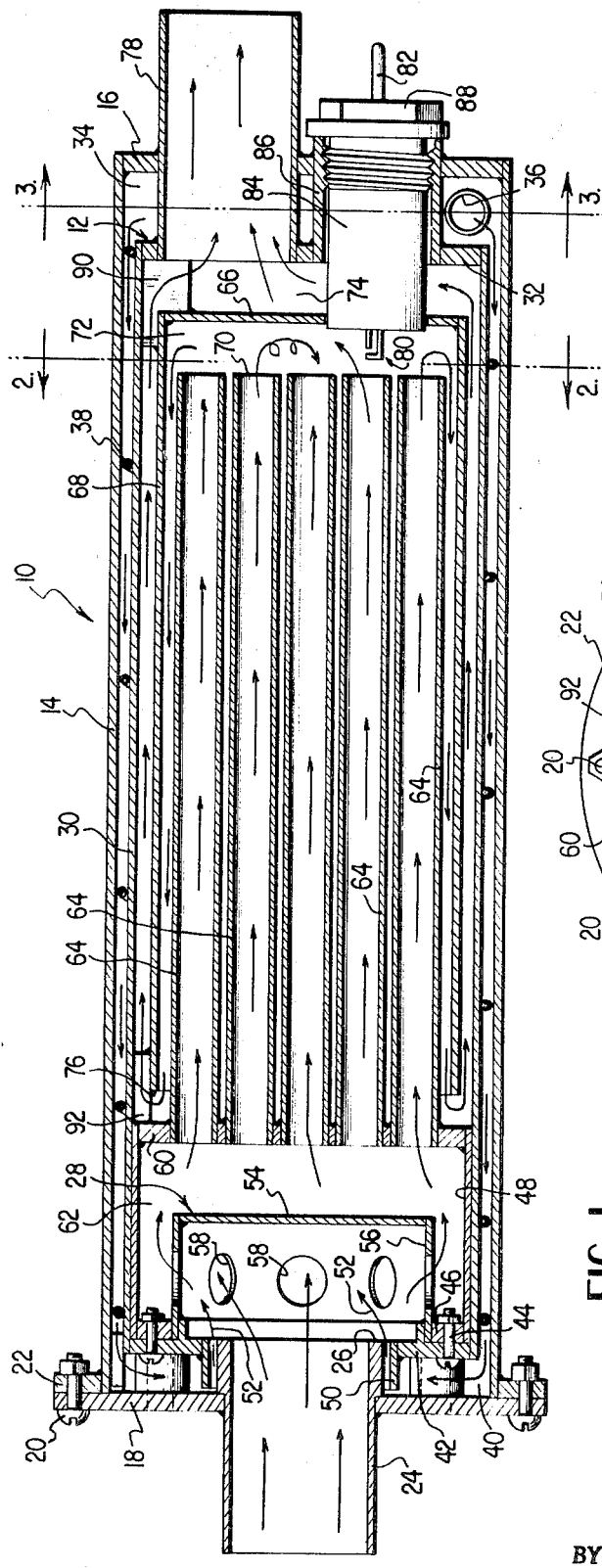
FIG. 1
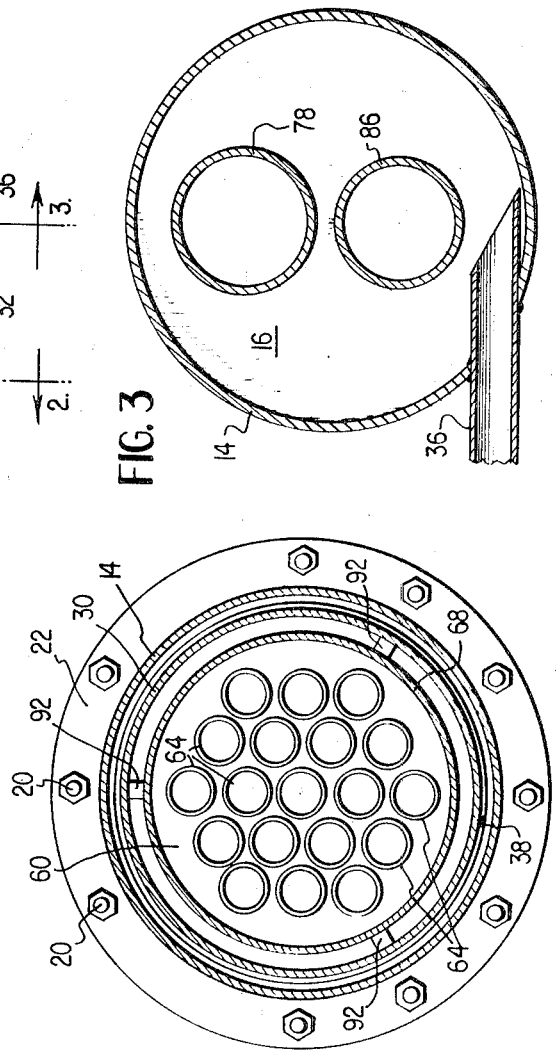
FIG. 3
FIG. 2
INVENTOR
JAMES W. McCROCKLIN
BY *Spencer & Kaye*
ATTORNEYS.

EMISSION CONTROL DEVICE

BACKGROUND OF THE INVENTION

The emission of unburned hydrocarbon and carbon monoxide components in the exhaust gases emanating from internal-combustion engines is known to constitute a major source of air pollution in many localities and various proposals have been offered for lowering the level of such emission.

The internal-combustion engines used to power vehicles operate over a wide range of conditions of load and engine speed and several of these conditions are particularly conducive to the emission of high percentages of unburned hydrocarbons and carbon monoxide in the engine exhaust gas. In fact, almost any condition other than constant speed under moderate load will produce unacceptable levels of unburned hydrocarbons and carbon monoxide in the exhaust gas. However, the different unacceptable emission-producing conditions display different and unique characteristics which although they may be dealt with individually, have for the most part defied efforts directed toward providing a single device or system which will reduce the emission to acceptable levels under all of these conditions. Thus, for example, a system which reduces the emission under engine idling no load condition may be woefully inadequate during conditions of acceleration under load or deceleration under load, etc.

In addition, the time history of engine operation introduces other variables with which difficulty is encountered. For example, the problems encountered in controlling emission of unburned hydrocarbons and carbon monoxide with respect to an engine which has been started after a long period of inactivity and which therefor is operating relatively "cold" are specifically different from the problems encountered with the same engine after it has come up to operating temperature.

Furthermore, no matter what proposal is offered, it must not only be efficient in terms of emission control, but also it must be capable of continuing operation substantially at its initial level of efficiency without requiring an inordinate amount of maintenance and, in addition all of this must be accomplished within the realm of reasonable initial cost.

SUMMARY OF THE INVENTION

Accordingly, it is an object of this invention to provide a device for reducing the emission of unburned hydrocarbons and carbon monoxide to acceptable levels in the exhaust gas of an internal-combustion engine, which device is operative under the most adverse circumstances or conditions of engine operation.

Specifically, the present invention is directed to a device of the afterburner type which is effective to complete the combustion of unburned hydrocarbons and carbon monoxide sufficiently well as to reduce these components to acceptable levels The present invention relates to an emission control device of the afterburner type in which preheating of the incoming air and superheating of the exhaust gas and incoming combustion-supporting air are controlled relatively to the ignition of the mixture so as to effect substantially complete combustion of unburned hydrocarbons and carbon monoxide under any operating condition of the engine.

Since the above-mentioned control may be effected by the flow reversal of the exhaust gases passing through the device, the construction may be such as to achieve the afterburning effect and an acoustical muffling effect simultaneously Essentially, the device includes an inner and an outer housing defining a flow passageway therebetween for incoming air which is introduced, together with the incoming exhaust gas, directly into one end of the inner housing and the mixture is then caused to flow through a series of parallel tubes which discharge into one end of a flow reversing device whereat the mixture is ignited. The afterburning exhaust mixture is then caused to flow along the outside of the tubes thereby superheating the incoming mixture and then to flow in reverse direction along the inner surface of the wall of the inner housing whereby to preheat the incoming air. The passageway for the incoming air is substantially lengthened to enhance the preheating effect by providing a spiral passageway between the inner and outer housings.

BRIEF DESCRIPTION OF THE DRAWINGS

FIG. 1 is a longitudinal section taken through the emission control device according to the present invention.

FIG. 2 is a transverse section taken substantially along the plane of section line 2—2 in FIG. 1.

FIG. 3 is a transverse section taken substantially along the plane of section line 3—3 of FIG. 1.

DETAILED DESCRIPTION OF THE PREFERRED EMBODIMENTS

With reference to FIG. 1, the combined acoustical muffler and emission control device includes an outer housing indicated generally by the reference character 12, the flow of exhaust gases and afterburning mixture through the device occurring entirely within the confines of the inner housing 12 and the incoming combustion-supporting air being introduced into the outer housing and flowing therewithin along a passageway defined between the inner and outer housings so as to preheat the incoming air by indirect heat exchange with the burning exhaust gases before introduction into admixture with the incoming exhaust gases.

For this purpose the outer housing will be seen to comprise a tubular shell or wall 14 closed at opposite ends by the end walls 16 and 18. For purposes of assembly and disassembly, the end wall 18 may be secured by fasteners 20 to a flange 22 suitably welded or otherwise fixed to the outer surface of the wall 14 and the end wall 18 is provided with an opening through which the inlet conduit 24 extends, the latter being preferably welded directly to the end wall, as shown. The inner end 26 of the inlet conduit 24 extends into one end of the inner housing 12 and discharges directly thereinto, within the confines of the mixing device indicated generally by the reference character 28. The tubular wall 30 of the inner housing 12 is disposed concentrically with respect to the tubular wall 14 of the outer housing and is substantially uniformly spaced with respect thereto so as to define an annular space which provides a passageway for incoming air. An end wall 32 of the inner housing is spaced from the corresponding end wall 16 of the outer housing to form an inlet zone 34 into which incoming air is introduced tangentially through the inlet pipe 36 projecting into the outer housing and directed substantially tangentially with respect thereto.

The incoming air is pumped into the outer housing by any suitable means and the swirling motion imparted to the incoming fluid is continued within the region defined between the two walls 14 and 30 by means of a length of wire 38 spirally wound about the wall 30 of the inner housing and suitably secured thereto as by tack welding. In this way, the passageway for the incoming air is substantially lengthened so that the preheating effect thereof, as will be hereinafter described, is enhanced materially.

The incoming air discharges from the passageway at the inlet end of the device into the zone or region 40 provided between the end wall 18 of the outer housing and the end wall 42 of the inner housing. The end wall 42 is removably secured as by fasteners 44 to an annular collar 46 fixed within the sleeve 48 fitted within the corresponding end of the wall 30 and is provided centrally with an opening receiving a further sleeve 50 concentric with and spaced from the corresponding end of the inlet conduit 24 and which terminates short of the end wall 18 of the outer housing so as to permit the incoming air to be discharged into the mixing device 28 as indicated by the arrows 52. The mixing device is in the form of a cup having an imperforate end wall 54 and a sidewall 56 having a series of openings 58 therein, the incoming exhaust gas impinging substantially directly against the end wall 54 to effect turbulence within the mixing device 28 and thereby effecting thorough mixing of the incoming air and exhaust gases within the device 28 before discharge through the openings 58 thereof.

The aforementioned sleeve 48 carries a header plate 60 which is spaced from the end wall 42 and which defines an expansion chamber 62 within which further mixing of the mixture takes place before same enters the individual tubes 64 which extend from the header plate 60 toward the opposite end wall 32 of the inner housing 12.

A flow reversing device is located within the inner housing and comprises an end wall 66 having a skirt 68 secured thereto. The end wall 66 is located between the ends 70 of the tubes 64 and the end wall 32 of the inner housing and defines an ignition zone 72 on one side thereof and an outlet chamber 74 on the opposite side thereof, as will hereinafter appear. The skirt 68 extends from the wall 66 in surrounding relationship to the tubes 64 and terminates as indicated by the reference character 76 in spaced relationship to the header plate 60 so as to allow the reverse flow of gases as indicated by the arrows. From what has been described, it will be appreciated that thorough mixing of the incoming air and the incoming exhaust gases will be effected by the time they have reached the ignition zone 72 so that the greatest possibility exists for the thorough and complete ignition and combustion of any unburned hydrocarbon fuel or carbon monoxide which may have been present in the incoming exhaust gas. The afterburning mixture flows within the skirt 68 to the left from the ignition region 72 shown in FIG. 1 along the outsides of the tubes 64 and, in the process, effects superheating of the incoming mixture assuring that its temperature will be sufficiently high as to allow proper ignition to be initiated and sustained at the ignition zone 72. Upon reaching the end of the skirt 68, the afterburning mixture then reverses direction and flows between the skirt 68 and the wall 30 of the inner housing, it being appreciated that the skirt 68 is concentrically disposed with respect to the wall 30 of the inner housing. The afterburning gas then flows to the discharge or collection zone 74 and then outwardly through the outlet conduit 78. As shown, the outlet conduit 78 projects through both the end walls 32 and 16 and preferably is welded to both.

The ignition device may take the form of a conventional spark plug whose electrodes 80 are exposed within the region 72, a suitable conductor 82 being provided which extends to a conventional source of continuous or intermittent sparking current. The spark plug is seated within a hollow plug member 84 which is threaded within a sleeve 86 projecting through the end walls 16 and 32 and secured thereto and which plug member 84 is provided with a headed end portion 88 whereby the entire assembly may be removed as may be required.

The flow reversing device 68 is suitably held in position within the confines of the inner housing by means of a series of ears at one end and a series of ears 92 at its other end, FIG. 2 illustrating the fact that three equidistantly spaced ears may be provided in each case.

In any event, it will be appreciated that the ignition zone 72 is so located within the system as to cause not only superheating of the incoming mixture but also preheating of the incoming fresh air. It will also be appreciated that the incoming fresh air may simply be ambient air or it may be a mixture of ambient air and other gas as for example from a crankcase vent. The incoming air is heated to a temperature in the order of at least about 1000° F. and the superheating of the mixture of exhaust gas and incoming air is sufficient to assure that its temperature upon reaching the ignition zone 72 is at least about 1700° F., thus assuring that ignition is sustained and effecting substantially complete combustion of unburned hydrocarbons and carbon monoxide.

The incoming air is supplied by a pump driven at or proportional to engine speed and having sufficient capacity to supply the requisite amount of incoming air under all conditions. Since the mass rate of exhaust gas flow is dependent not only upon engine speed but also upon engine load, the pump for incoming air may be controlled as to volumetric output as function of inlet manifold vacuum as well as a function of engine speed. Ideally, the pump will deliver just that mass rate flow of incoming air as will substantially assure theoretically complete combustion of unburned hydrocarbons and carbon monoxide in the exhaust gas.

It should be noted that the present invention is not to be limited to the specific elements shown and described herein but is subject to modification. For example, the parts can be assembled in a manner which allows for disassembly, or can be completely welded together with no threaded connections. The ignition device can be threaded into the housing or can be permanently positioned in place. Also, the spiral air passage can be formed in other manners than by the use of wire as disclosed hereinabove.

I claim:

1. A combined acoustical muffler and afterburner device for effecting substantially complete combustion of unburned hydrocarbons and carbon monoxide which may be present in the exhaust gas of an internal-combustion engine, comprising, in combination:

an elongate outer housing forming an enclosure;

an elongate inner housing disposed within said outer housing, said inner and outer housings having respective tubular walls disposed in substantially uniformly spaced relation defining a circumferential passageway therebetween extending along the length of said outer housing:

an exhaust gas inlet conduit extending through said outer housing at one end thereof and discharging into the corresponding one end of said inner housing;

means for introducing incoming air into said passageway at the other end of said outer housing and said circumferential passageway communicating with said one end of the inner housing adjacent the region at which exhaust gas is discharged thereinto whereby the incoming air and exhaust gas are intermixed thereat;

said inner housing including a transverse header plate spaced axially from said one end thereof, a plurality of tubes projecting from said header plate toward the other end of said inner housing to convey said intermixed exhaust gas and incoming air therethrough;

a flow reverser comprising a transverse wall spaced between the ends of said tubes and the other end of said inner housing and a tubular skirt extending from said transverse wall toward but terminating short of said header plate in surrounding relation to said tubes and inwardly spaced substantially uniformly with respect to said tubular wall of the inner housing;

means for igniting the intermixed exhaust gas and incoming air emanating from said tubes whereby afterburning exhaust gas passes first within said skirt toward said header plate and then in reverse direction outside said skirt between it and the tubular wall of said inner housing to the other end of the latter, respectively to superheat the intermixed exhaust gas and incoming air passing through said tubes and to preheat the incoming air in said passageway;

and an outlet conduit extending from said other end of the inner housing through said other end of the outer housing.

2. The combined muffler and afterburner according to claim 2 including a mixing device within said one end of said inner housing, said mixing device comprising an imperforate wall spaced inwardly from said inlet conduit and against which incoming exhaust gas impinges, and perforate skirt extending from said imperforate wall to said one end of inner housing.

3. The combined muffler and afterburner according to claim 4 wherein said inner and outer housings are provided with end walls at said one end thereof which are spaced apart to define an air chamber into which said passageway discharges; said inlet conduit passing through said air chamber and the corresponding end wall of the inner housing having an opening larger than said inlet conduit to admit air from said air chamber peripherally around the inlet conduit.

4. A combined acoustical muffler and afterburner device for effecting substantially complete combustion of unburned hydrocarbons and carbon monoxide which may be present in the exhaust gas of an internal-combustion engine, comprising, in combination:

an elongate outer housing forming an enclosure;

an elongate inner housing disposed within said outer housing, said inner and outer housings having respective tubular walls disposed in substantially uniformly spaced relation defining a circumferential passageway therebetween extending along the length of said outer housing;

an exhaust gas inlet conduit extending through said outer housing at one end thereof and discharging into the corresponding one end of said inner housing;

means for introducing incoming air into said passageway at the other end of said outer housing and said circumferential passageway communicating with said one end of the inner housing adjacent the region at which exhaust gas is discharged thereinto whereby the incoming air and exhaust gas are intermixed thereat;

said inner housing including a transverse header plate spaced axially from said one end thereof, a plurality of tubes projecting from said header plate toward the other end of said inner housing to convey said intermixed exhaust gas and incoming air therethrough;

a flow reverser comprising a transverse wall spaced between the ends of said tubes and the other end of said inner housing and a tubular skirt extending from said transverse wall toward but terminating short of said header plate in surrounding relation to said tubes and inwardly spaced substantially uniformly with respect to said tubular wall of the inner housing;

means for igniting the intermixed exhaust gas and incoming air emanating from said tubes whereby afterburning exhaust gas passes first within said skirt toward said header plate and then in reverse direction outside said skirt between it and the tubular wall of said inner housing to the other end of the latter, respectively to superheat the intermixed exhaust gas and incoming air passing through said tubes and to preheat the incoming air in said passageway;

said inner and outer housings are provided with end walls at said other ends thereof which are spaced apart to define a chamber;

said means for introducing incoming air comprising a tube discharging tangentially into said chamber;

wire extending spirally around said inner housing, said wire being of a thickness substantially to bridge between said inner and outer housings;

and an outlet conduit extending from said other end of the inner housing through said other end of the outer housing.

5. A combined acoustical muffler and afterburner device for effecting substantially complete combustion of unburned hydrocarbons and carbon monoxide which may be present in the exhaust gas of an internal-combustion engine, comprising, in combination:

an elongate outer housing forming an enclosure;

an elongate inner housing disposed within said outer housing, said inner and outer housings having respective tubular walls disposed in substantially uniformly spaced relation defining a circumferential passageway therebetween extending along the length of said outer housing;

an exhaust gas inlet conduit extending through said outer housing at one end thereof and discharging into the corresponding one end of said inner housing;

means for introducing incoming air into said passageway at the other end of said outer housing and said circumferential passageway communicating with said one end of the inner housing adjacent the region at which exhaust gas is discharged thereinto whereby the incoming air and exhaust gas are intermixed thereat;

said inner housing including a transverse header plate spaced axially from said one end thereof, a plurality of tubes projecting from said header plate toward the other end of said inner housing to convey said intermixed exhaust gas and incoming air therethrough;

a flow reverser comprising a transverse wall spaced between the ends of said tubes and the other end of said inner housing and a tubular skirt extending from said transverse wall toward but terminating short of said header plate in surrounding relation to said tubes and inwardly spaced substantially uniformly with respect to said tubular wall of the inner housing;

means for igniting the intermixed exhaust gas and incoming air emanating from said tubes whereby afterburning exhaust gas passes first within said skirt toward said header plate and then in reverse direction outside said skirt between it and the tubular wall of said inner housing to the other end of the latter, respectively to superheat the intermixed exhaust gas and incoming air passing through said tubes and to preheat the incoming air in said passageway;

means within said passageway to cause a spiraling movement of the air which is passing along the length of said passageway;

and an outlet conduit extending from said other end of the inner housing through said other end of the outer housing.